Z. Swope,
Cage Trap,
Nº 25,224. Patented Aug. 23, 1859.

Witnesses
Reuben H. Long
Walter S. Evans

Inventor
Zuriel Swope

UNITED STATES PATENT OFFICE.

ZURIEL SWOPE, OF LANCASTER CITY, PENNSYLVANIA.

ANIMAL-TRAP.

Specification of Letters Patent No. 25,224, dated August 23, 1859.

*To all whom it may concern:*

Be it known that I, ZURIEL SWOPE, of the city of Lancaster, in the county of Lancaster and State of Pennsylvania, have invented a new and useful Improvement in Closing and Resetting Animal-Traps by the Weight of the Animal; and I do hereby declare that the following is a full, clear, and exact description of the construction and operation of the same, reference being had to the accompanying drawings, making a part of this specification, and to the letters of reference marked thereon.

The nature of my invention consists in arranging a sinking bottom in the entering chamber of the trap so that the weight of the animal in entering on said bottom shall close the trap, whether it touches the bait or not, and then again by the weight of the animal in the counter balance chamber through which it attempts to escape the trap will be reset ready for another victim.

To enable others skilled in the art to make and use my invention, I will proceed to describe its construction and operation.

Figure 1:
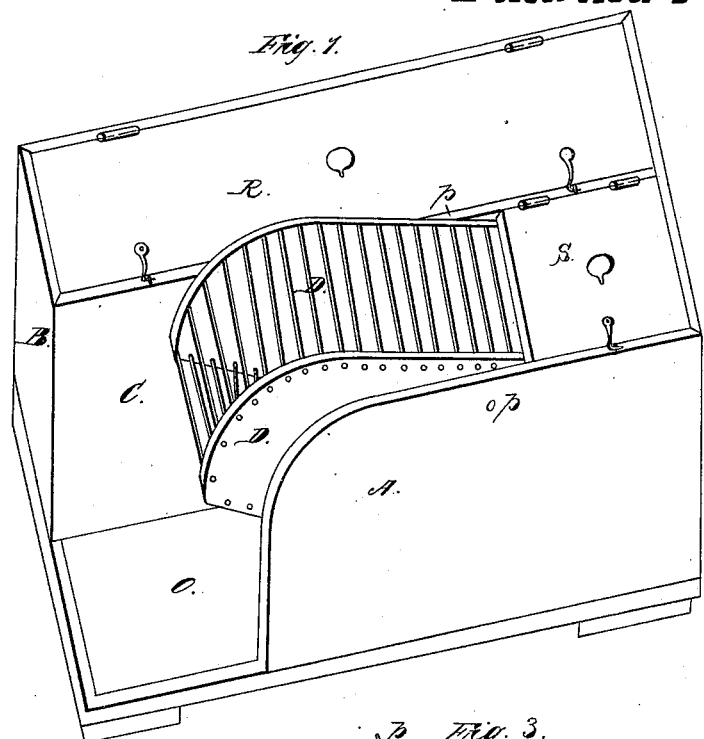
Figure 3:
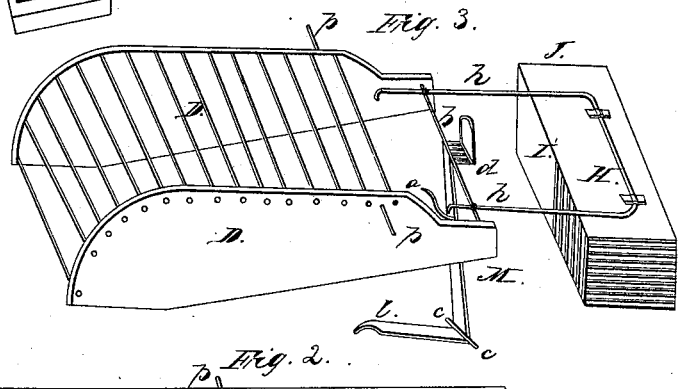
Figure 2:
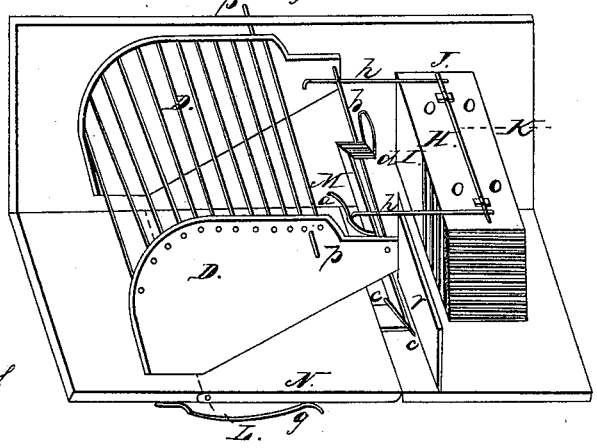

Figure 1 represents in the accompanying drawings, a perspective view of the trap when set, Fig. 2 a longitudinal section showing the sinking bottom, drop wire cage as well as the counter balance chamber; Fig. 3 a view of the drop wire cage and its connection with the counter balance chamber and bait lever, the same letters designating like parts on each of the several figures.

Fig. 1, R represents the lid of the retaining chamber and is fastened down. S is the lid closing over the counter balance chamber in the rear of the reception chamber O and is also closed.

The trap is formed by making a box of any desired size, and then dividing it longitudinally near the center by a partition C reaching from one end to the other and from the bottom to top. The box is represented in the drawing by A, B, the partition by C Fig. 1. The side A of the box forming the reception chamber O is shorter than the body of the box and is rounded at the free end next the entering end of the reception chamber where it is open. Across the reception chamber O near the top is suspended on a pivot $p$ $p$ at either side the drop wire cage D resting its pivots in the partition C and side piece A and to the projecting arms $h$ $h$ at the rear end is attached the counter balance chamber H.

The counter balance chamber H is formed by constructing a box of tin or any other suitable material, in length equal to the width of the drop wire cage D, and in breadth equal to the length of the animal while in depth it is equal to one half the depth of the sides of the trap minus the thickness of the lid S which covers it; it is open at the sides next to the partition C, and side A as well as open half its length in front at I with an oblong aperture behind for admitting light from the rear, which said aperture is made corresponding with an opening in the rear end of the trap when closed. The object of these apertures being for admitting light from the rear as an inducement for the animal to enter the counter balance chamber as a means of escape.

In the partition C, there is an opening K at the lower corner of the rear end which corresponds with the end or side opening J in counter balance chamber H, when the trap is set. This opening K of the partition C is covered by a drop door which is so constructed that it permits the animal to raise it and enter through from the counter balance chamber into the retaining chamber, but prevents the animal to return.

The sinking bottom underneath the drop wire cage, is so constructed that its front end rests at each side on a pivot at L, while the other or rear end is free and supported up by the spring $g$, as well as resting on the lower arm $l$ of the bait lever M to which it is fastened by a staple near the end at $l$, affording play to slide as the sinking bottom is raised by the spring $g$ and depressed by the weight of the animal. This spring, $g$, is made strong enough to raise the sinking bottom up, and yet weak enough to be depressed by the weight of the animal on top. The bait lever M is so constructed by working on a pivot $c$, $c$, fastened to the bottom of the trap, that the lower arm $l$ by being moved or depressed by the weight of the animal on the sinking bottom N throws the notch $d$ of the upper arm from the catch wire $b$ of the drop wire cage, and closes the trap; attached to the upper arm of the bait lever M is a small hook $a$, to which the bait is fastened which by being drawn forward by the animal, also detaches the notch $d$ from the catch wire $b$ and shuts the trap.

A small receptacle for containing rice or any other article of which the animal is fond may be placed near the bait lever to induce the animal to enter in.

The drop wire cage and counter balance chamber is so arranged on the pivots that when the notch of the bait lever is removed from the catch wire, the preponderating weight of the cage closes the trap and shuts the animal in.

From the foregoing description of my improvement it will be seen that when as represented in Fig. 1 the animal is induced to enter the reception chamber O, by the bait either on the hook $a$ or in the receptacle, its weight on the sinking bottom N acting on the lower arm $l$ of the bait lever M detaches the notch $d$ of the upper arm of said lever from the catch wire $b$ of the drop wire cage D and closes the cage and shuts the animal in. The animal thus caught in endeavoring to make its escape enters the only available opening and passes at once into the opening I, of the counter balance chamber H. Its weight here sinks this chamber and raises the drop wire cage. The notch $d$, of the bait lever is thrown over the catch wire $b$, and the trap is reset. The animal is prevented from passing back into the cage by a small partition $r$, behind which the counter balance chamber is now depressed, and the only way of exit is now through the opening K, in the partition C, through which it passes into the retaining chamber and is prevented from returning by the drop door. The trap is now reset and another passes through the same operation.

I am aware that animal traps similar in appearance to mine have been heretofore used. I therefore wish it to be distinctly understood that I make no claim to the drop wire cage, or to the various chambers employed as distinct devices nor in the combination heretofore adopted by Samuel Gibson or others; but What I do claim as my invention and wish to secure by Letters Patent, is—

1. I claim the sinking bottom N, constructed as described for closing the trap when acting in combination with the spring $g$, and bait lever M, substantially as already specified.

2. I claim the counter balance chamber H, constructed as described and operating for the purpose of resetting the trap as already set forth.

ZURIEL SWOPE.

Witnesses:
 WALTER G. EVANS,
 ADRIAN V. B. ORR.